United States Patent Office 2,733,728
Patented Feb. 7, 1956

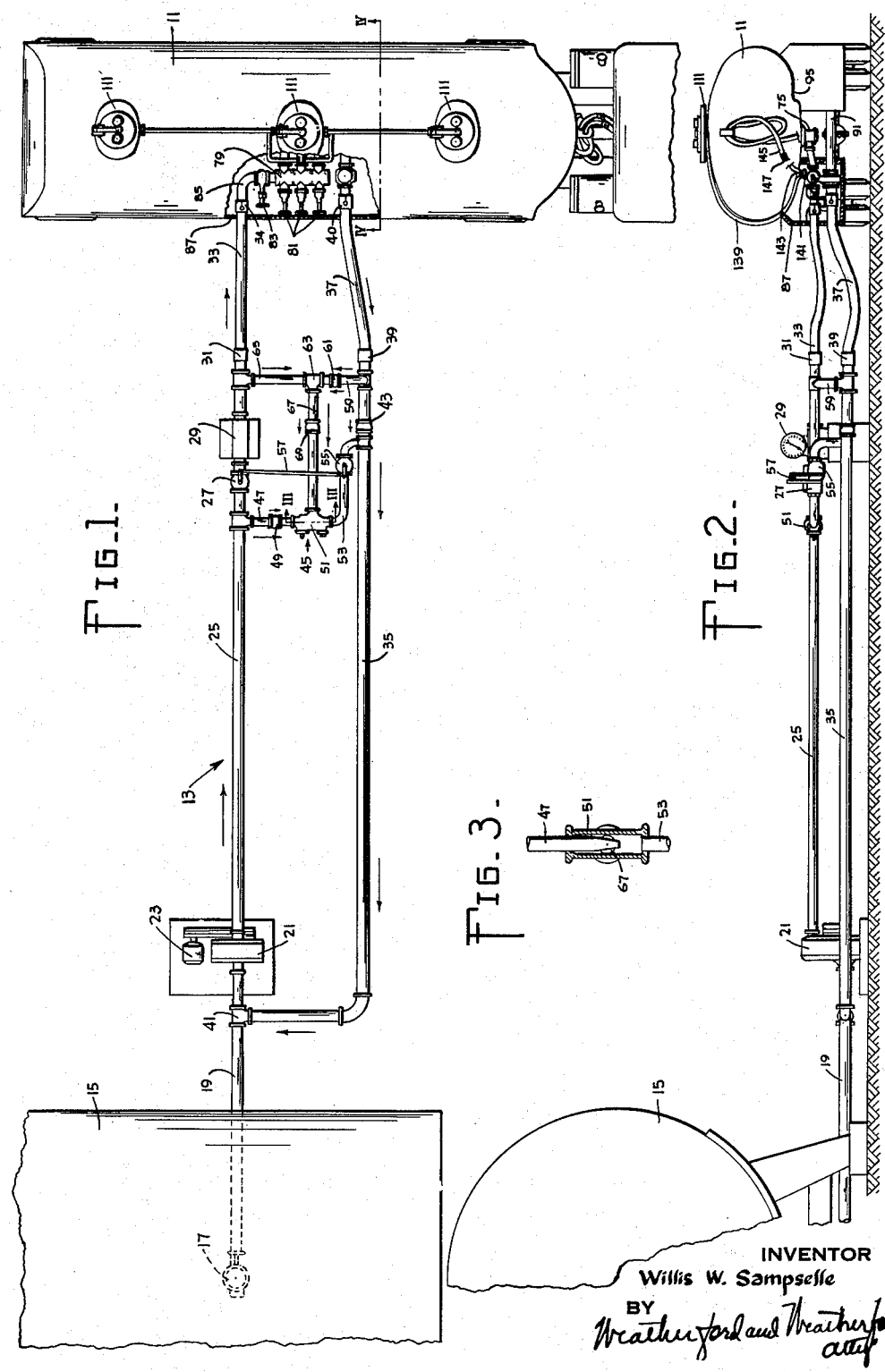

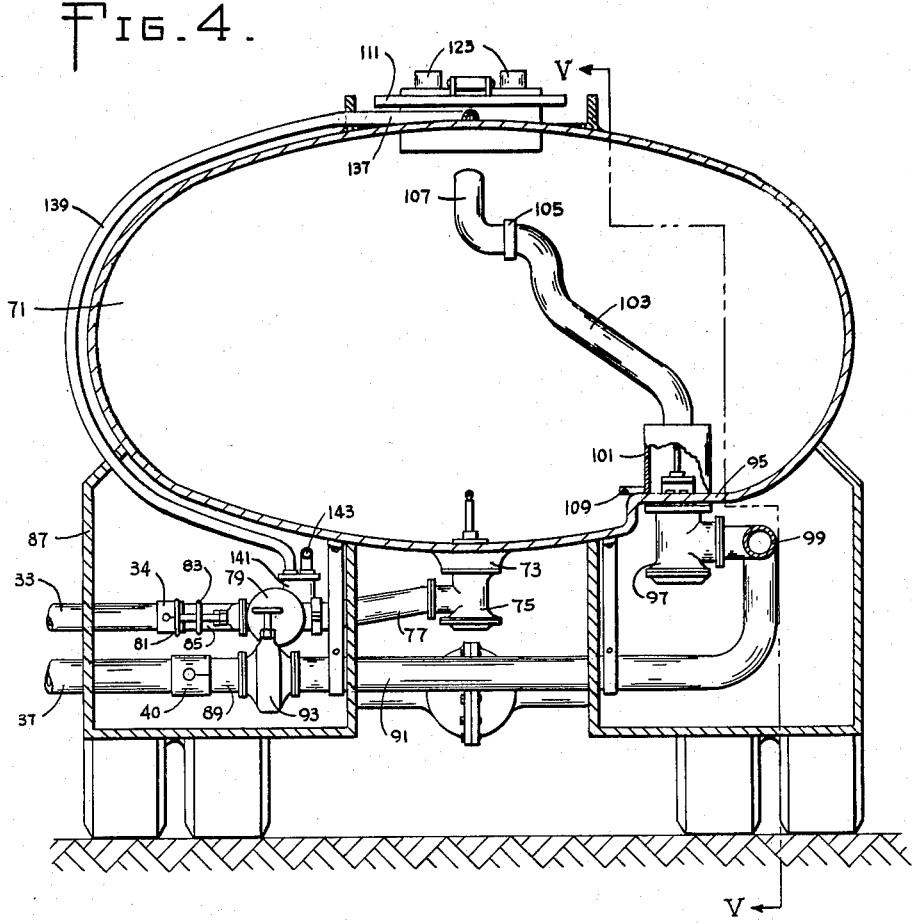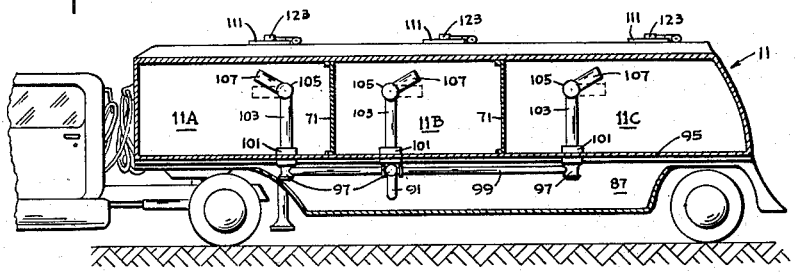

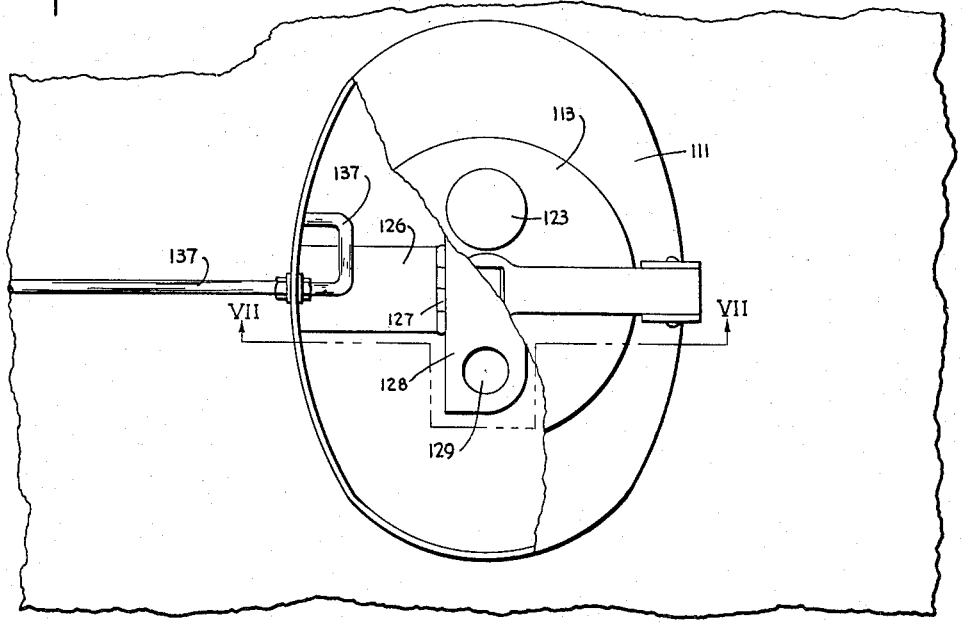
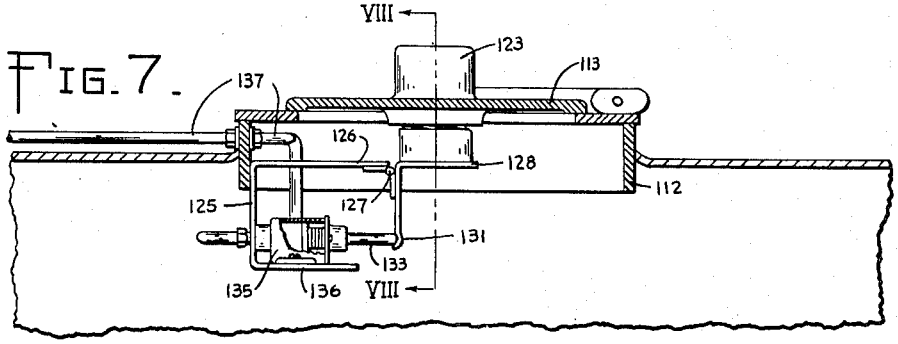
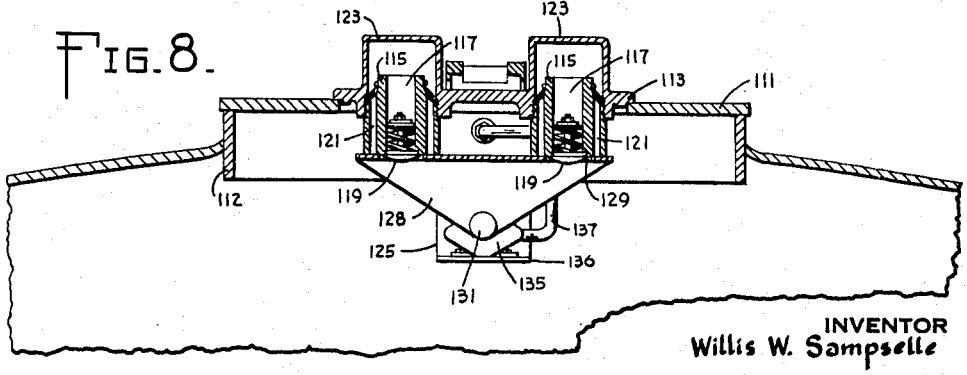

2,733,728

TANK TRUCKS AND LOADING SYSTEM THEREFOR

Willis W. Sampselle, Kenton, Ohio

Application October 29, 1952, Serial No. 317,560

7 Claims. (Cl. 137—235)

This invention relates to certain new and useful improvements in tank trucks, particularly of the type adapted for use in the cross country transportation of inflammable liquids, such as gasolene and the like, and further relates to new and useful improvements in tank truck loading systems, particularly adapted for use in conjunction with tank trucks of the type and kind referred to in this application.

The practice, as heretofore followed in the loading of conventional tank trucks using conventional loading means, has been particularly characterized by a highly undesirable and dangerous loss of fluid through the escape of fumes from the pressure venting systems of such tank trucks as the load of fluid is introduced into the truck during loading. In addition to the actual loss of fluid sustained by the escape of such fumes, which, in extended operation, will amount to a very substantial quantity of such fluid in the loading of tank trucks with volatile fluids such as gasolene and other highly inflammable substances, the escape of the vapor and fumes during such loading operation has resulted in an extreme danger of explosion and combustion which has in many instances further resulted in property damage and loss of life.

It has heretofore been conventional to provide tank trucks with inlet openings, usually contained in domes carried as a superstructure by the tank body of such trucks for the purpose of receiving the delivery of fluids for transportation in such trucks from overhead and discharge by gravity into the tank interior. Conventionally tank interiors are divided by bulk heads or other suitable wall structures into compartments of desirable size. It has further been conventional to provide such tank trucks with pressure venting systems carried in the domes so as to relieve excessive pressure which may build up in the contents of the tank, as during transportation. Such pressure venting systems have normally comprised the use of one or more pressure vent valves carried by such domes, such valves incorporating a central inlet passageway, including a suitable check valve, against exhaust outwardly through such inlet openings and a group of elongated discharge passageways, preferably arranged in an annular arrangement about the periphery of the central inlet, the discharge passageways being provided to relieve any excess accumulation of pressure in the interior of the respective chambers of such tanks.

In conventional filling of tank trucks as the fluid is introduced through the upper opening, vaporization of such fluids, which is particularly acute with volatile fluids of the character of gasolene and the like, has been permitted to escape from the discharge passageways of the pressure venting system, resulting in a consequent loss of the fluid being introduced into the tank truck and in addition broadcasting the vapors around the exterior of the tank truck, which, in the case of volatile fluids such as gasolene, has created, as pointed out above, a serious risk and danger.

The principal object of the present invention is to provide a new and novel tank truck construction which is adapted to accommodate loading of the tank truck without loss of vapors during such process.

A further object of the invention is to provide a tank truck which is particularly adapted during loading of the truck to conduct vapors discharged from volatile fluids introduced into the interior of the truck by return line back into the pumping system by which the loading is accomplished.

A further object of the invention is to provide a tank truck which is adapted to be loaded by an underloading system, which is loaded from below rather than an overhead loading system.

A further object of the invention is to provide a loading system for tank trucks which is adapted to underload such trucks.

A further object of the invention is to provide a loading system for tank trucks which includes means for cleansing the loading system of the fluid being loaded into the tank truck after cessation of such loading.

A further object of the invention is to generally improve the efficiency and safety of loading tank trucks with fluids; and A further object of the invention is to generally improve the design, construction and efficiency of liquid-carrying trucks.

The means by which the foregoing and other objects of the invention are accomplished and the manner of their accomplishment will be readily understood from the following specification on reference to the accompanying drawings, in which:

Fig. 1 is a plan view of the loading system of the present invention, illustrated as coupled to and effecting loading of a tank-type trailer.

Fig. 2 is a side elevational view of the device as seen in Fig. 1.

Fig. 3 is a fragmentary sectional view on an enlarged scale, taken as on the line III—III of Fig. 1.

Fig. 4 is a cross sectional view on an enlarged scale taken as on the line IV—IV of Fig. 1.

Fig. 5 is a view on a scale similar to the scale of Fig. 1, taken as on the line V—V of Fig. 4.

Fig. 6 is a fragmentary top plan view on a further enlarged scale with certain portions broken away for purposes of illustration, illustrating the arrangement of the domes and the valving of the present invention.

Fig. 7 is a sectional view taken as on the line VII—VII of Fig. 6; and

Fig. 8 is a transverse sectional view taken as on the line VIII—VIII of Fig. 7.

Referring now to the drawings in which the various parts are indicated by numerals, it will be seen that the present invention particularly comprises a new tank-type body 11, particularly adapted for use with the new and novel loading system 13.

Loading system 13 is adapted for connection as to a storage tank 15, discharge from the storage tank being controlled as through a suitable valve 17 connected to a pipe 19, pipe 19 being connected to a suitable pump 21, driven by suitable means, such as a motor 23. Discharge from pump 21 is delivered by a pipe 25 to a gate valve 27 and through gate valve 27 into a meter 29 by which flow from discharge pipe 25 is measured. Coupled to the end of discharge pipe 25, as by a suitable coupling 31, is one end of a supplemental line, preferably a flexible hose 33. The opposite end of flexible hose 33 is adapted for coupling as by a quick operating coupler 34 to the intake system of a tank body 11.

The loading system further includes a return line 35 which is preferably provided at one end with a flexible hose 37, connected to the line 35 as by suitable coupling 39, the return line hose 37 being adapted for connection as by a quick coupler 40 to a return discharge valve forming part of the tank body system. Return line 35 is preferably connected into pipe 19, as at 41, between pump 21 and storage tank valve 17. Preferably a one-way check valve 43 is interposed in return line 35 intermediate its length to prevent reverse flow through the return line toward the tank attaching end of same.

Interposed in discharge line 25 and return line 35 is an eduction means 45 adapted to be employed for cleansing the loading system 13 of excess liquid contained therein and remaining therein upon cessation of loading. Eduction system 41 comprises a branch line 47 leading through a one-way check valve 49 to a venturi-type eductor 51, discharge from eductor 51 being led by a line 53 through a gate valve 55 into return line 35 between check valve 43 and connection 41, as at 56. Preferably gate valve 55 is coupled to gate valve 27, as by a lever 57, for joint and concurrent operation of the gate valves 55, 27 by shift of the lever 57. The valves 55, 27 are arranged in opposite positions so that upon concurrent shift of same through lever 57 one of the valves will be closed as the other of the valves is opened and vice versa.

An end branch line 59 from the return line 35 is led through a one-way check valve 61 into a connection 63. Oppositely leading into connection 63 is an end branch line 65 leading from discharge pipe 25. The end branch lines 59, 65 are respectively connected to the lines 25, 35 adjacent the couplings 31, 39 so as to connect the respective ends of the discharge line and the return line into the eductor system. Leading from the connection 63 and receiving flow from the end branch lines 59, 65, is a pipe 67 which leads through a suitable one-way check valve 69 toward and into eductor 51.

Truck body 11 is preferably divided by bulk heads 71 into compartments 11A, 11B, 11C. Each of the compartments is provided at its lower end with a collecting sump 73 and each of the compartments is supplied with a remote control valve 75 mounted in communication with the sump 73 and preferably remotely operated as by pneumatic controls of conventional design, the controls for valve 75 not being shown in detail. Each of the compartment valves 75 is connected by pipes 77 into a manifold 79, manifold 79 being provided with a plurality of gate valves 81 respectively adapted to control flow through the pipes 77 to or from the manifold 79. Manifold 79 is connected through a gate valve 83 to a suitable spout 85, the spout 85 being preferably provided with a fitting adapted to receive and be engaged by the quick coupler 34.

It will be observed that each of the sumps 73 is located substantially on lower longitudinal mid line of truck tank body 11 and that manifold 79 is positioned to one side of the tank body, preferably being housed in a suitable casing or housing 87. Likewise mounted in the housing 87 is the discharge end 89 of a collector pipe 91. The discharge end of the pipe is provided with a suitable fitting which is adapted to receive and be engaged by a quick coupler 40. Control of flow from collector pipe 91 through discharge end 89 is effected by a gate valve 93, likewise mounted in housing 87.

Extending longitudinally of tank body 11 and preferably laterally offset from the longitudinal line of the bottom of the body is a flat or shelf 95, the truck body being formed to provide for this shelf. The shelf is apertured into each of the body compartments 11A, 11B, 11C and into each of the apertures is communicated a remote control valve 97, preferably, like the valves 75, being controlled by conventional pneumatic control means, which are not shown. Each of the valves 97 is connected as by pipes 99 to collector pipe 91 so as to communicate the valves 97 with collector pipe 91.

Surrounding and overlying each of the apertures into the compartments through the shelf 95 and seated on the shelf are barrel-like hollow bases 101, in the top of which bases 101 are mounted stand pipes 103. Preferably the stand pipes are convolute so as to position the upper end of the stand pipes adjacent the vertical center line of the tank body, as is best shown in Fig. 4. To the upper ends of the stand pipes 103 are rotatably secured, as by friction collars 105, elbows 107. It will be seen that the upper ends of stand pipes 103 at the point of connection of the elbows thereto is substantially horizontal and that the elbow is so arranged with relation thereto that the free ends of elbows 107 may be rotated in a vertical line of movement substantially along the vertical mid line of the body. The free ends of elbows 107 are open, providing a mouth for each of the composite stand pipes consisting of stand pipe section 103, collar 105 and elbow 107, the elbows communicating the open mouth into the interior of the stand pipes, and thence into the hollow bases 101, from which major flow is controlled by the remote control valves 97. Preferably each of the hollow bases 101 is provided with a small volume discharge pipe 109, the open end of pipes 109 respectively projecting into the compartments of the tank body adjacent the terminal edge of shelf 95.

It will be seen that elbows 107 by virtue of the rotatable connection between the elbows and stand pipes 103 may be adjusted as indicated in Fig. 5, so as to vary the position of the open mouths of elbows 107 and consequently to vary the usable capacity of the tank compartments beyond which overflow into elbows 107 and stand pipes 103 will be accomplished.

Each of the compartments at its upper end is provided with a dome 111 which preferably includes a downwardly depending skirt 112, skirt 112 projecting through the shell of tank body 11. A suitable manhole cover 113 is provided to cover each of the domes, the upper portion of the domes having a conventional opening formed therethrough which is covered by the manhole cover. Preferably the domes are each provided with a pair of pressure relief vents 115, the vents preferably consisting of a substantially cylindrical body portion having a central bore 117 provided with a one-way spring-loaded check valve 119 adapted to prevent outflow of air, fumes, liquid, or other matter through the central bore 117 and being adapted to yield to a difference of pressure so as to permit the inlet of air or other material through the central bore. The cylindrical body of the pressure relief vent systems is preferably provided with a plurality of vertically extending passageways 121 which are provided with suitable check valves preventing inflow through the vertical passageways 121 while permitting outflow therethrough. Preferably the vertical passageways 121 are arranged peripherally about the central bore 117 and are segregated from the central bore 117 by the material of the relief valve body. Each of the relief valve assemblies is capped with a suitable cap 123 carried by the manhole cover. In order to control outflow through the vertical valve passageways 121 a remotely controlled valve system is provided therefor by the present invention.

Rigidly secured to the skirt 112 within the tank body is a bracket 125. The brackets 125 are preferably substantially U-shaped members, as best shown in Figs. 6 and 7, with the legs of the U projecting inwardly across the interior of domes 111. To the upper legs 126 of brackets 125, at their inner ends, are hingedly secured as by hinges 127 angular flap valve members 128. One leg of the angle flap valves 128 is provided with a pair of spaced apertures 129 which are positioned to underlie the respective central bores 117 so as not to impede with the operation of the spring-loaded check valves 119.

The material of the flap members annularly about the spaced apertures 129 is adapted to underlie and close off the lower end of the vertical valve passageways 121. The opposite legs of angular flap members 128 project downwardly from hinge 127 by which the flap members are attached to the upper bracket legs 126, and at its lower end is preferably provided with a recessed abutment portion 131, which is positioned to be engaged by the thrust rod 133 of a pneumatically operated piston-and-cylinder assembly 135. The piston-and-cylinder assemblies 135 are rigidly mounted upon the lower legs 136 of brackets 125. The piston-and-cylinder assemblies 135 are directly operated responsive to the introduction of air pressure thereinto and are each provided with an air pressure line 137, the air pressure lines 137 respectively being extended through the skirts 112 of domes 111 above the surface of tank body 11 and being connected to an air pressure supply line 139, which preferably is extended downwardly about the exterior of the tank body and into housing 87. Air is supplied to the air supply line 139 through a conventional air control valve 141 within housing 87, the valve 141 being connected by an air line 143 to a source of air pressure, such as the compressed air supply lines 145 of the tank body 11. A connection between air line 143 and trailer air supply 145 may be made, as at 147.

In the operation and use of the device tank body 11 is positioned adjacent loading system 13 for the purpose of receiving thereinto the liquid to be discharged from the loading system. Elbows 107 on stand pipes 103 are adjusted to establish the desired level of liquid to be received and retained in the respective compartments of the tank body. Flexible hose 33 is coupled by coupler 34 to the spout 85 of manifold 79 and flexible return hose 37 is coupled by coupler 40 to the discharge end 89 of collector pipe 91. Gate valve lever 57 is manipulated so as to close gate valve 55 and concurrently to open gate valve 27. Manifold valve 83 is opened as are the valves 81 and discharge gate valve 83 is likewise opened.

Through the operation of the remote controls the valves 75 and the valves 97 are opened. Air under pressure is introduced from air supply 145 through air line 143 into air supply line 139 and thence through air pressure lines 137 into the respective piston-and-cylinder assemblies 135, effecting thrust upon the pistons therein projecting the thrust rods 133 inwardly into abutment with the abutment portions 131 of the flap valves 128, moving the apertured portion of the angular flap members upwardly so as to effect closing off of the vertical valve passageways 121.

With the devices thus prepared loading of the tank truck from the storage tank 15 may be begun, the tank valve 17 being opened and the pump 21 put into operation discharging liquid from the tank through meter 29, thence through hose 33 into manifold 79 and through pipes 77, through valves 75, now open, to flow into the interior of the respective tank compartments 11A, 11B, 11C. It will be seen that this loading operation is being conducted by introducing the liquid into the compartments of the tank body from below to flow upwardly under the pressure produced by pump 21 to effect filling of the tank body, thus eliminating the splashing and other possible dangerous incidents heretofore attendant upon loading which has been accompanied by gravity discharge.

It will be seen that as the liquid is introduced into the tank body the fumes therefrom will immediately begin to escape, this being particularly accentuated in connection with volatile liquids, such as gasolene and the like. Escape of these vapors and fumes outwardly of the tank body through domes thereof is effectively prevented by the angular flap valves 128, closing off the discharge openings in the domes and preventing outflow therefrom. As the compartment is filled it is of course necessary to provide for the egress of the air previously filling the interior of the compartments therefrom, and it will be seen that the open stand pipe assemblies, consisting of elbows 107, stand pipes 103, hollow bases 101 communicating through valves 97 into pipes 99, and thence to collector pipe 91 are effective to provide for the discharge of such air from the interior of the compartments. In addition this outflow of the fluid such as air from the respective compartments will similarly carry with it any vapors or fumes which may be discharged from the inflowing liquid.

It will be observed that the collector pipe 91 is connected through its discharge end 89 into return hose 37 which is connected to return line 35, flowing thence back into the main discharge system through connection 41 into pipe line 19.

When the truck has been filled to capacity as desired and established by the adjustment of elbows 107 relative to stand pipes 103, further introduction of liquid into the tanks by continued pumping will cause overflow into the open mouths of elbows 107 and thence through the stand pipes into the collector pipe 91 to return to the pumping system. As a result the loading system is positively prevented from delivering more than the desired quantity of liquid into the tank interior, the adjustment of the elbows establishing the upper level beyond which overflow will occur.

When loading has been completed to the desired capacity it is then desirable to remove from the loading lines and from the system excess volatile liquid which may remain therein. Gate valve lever 57 may then be shifted effecting closure of the discharge gate valve 27 and effecting opening of the gate valve 55. It is also desirable at this point to shut off valves 75 so as to interrupt any back flow therethrough from the tank compartments. With the gate valve 55 opened and gate valve 27 closed, discharge flow from pump 21 to discharge pipe 25 is by-passed into the eduction means 45. The flow through the venturi-type eductor 51 so accelerates the rate of flow as to create a partial vacuum in pipe 67, thus drawing from the end branch lines 59, 65, setting up a suction therethrough which is effective to withdraw from the hose 33, manifold 79 and pipes 77 and from meter 29 the liquid remaining therein, and is further effective to withdraw from the stand pipes and elbows 103, 107, pipes 99, collector pipe 91, and flexible hose 37, any liquid remaining therein. This liquid is collected and drawn into the pipe 67 which empties into the eductor and further flow is conducted from the eductor through eductor discharge line 53 into the return line 35. Thus it will be seen that the system is cleansed of excess liquid remaining therein.

When the eduction system cleansing operation has been concluded the remote valves 97 may be closed, shutting off flow through the respective valves and readying the device for disengagement with the loading system, which may be effected by disengaging the couplers 34, 40 from spout 85 and discharge fitting 89. Air pressure may be bled from the piston-and-cylinder assemblies 135, releasing the force exerted upon the thrust rods 133 and releasing the angle flap valves 127 to open by moving away from the lower ends of vertical valve passageways 121.

It will be seen that the tank is thus loaded and is ready for departure in transportation. It has been found that during transportation portions of the contents of the tank will, due to changes in level in the tank body, be caused to flow into the open mouths of elbows 107, and in order to prevent any accumulation or continued standing of the tank-contained liquids in the stand pipes 103 or bases 101 the small volume discharge pipes 109 adjacent the bottom of the bases 101 are provided so as to drain off any casual overflow into the stand pipes as during transportation.

When it is desired to unload liquid from the tank body 11, discharge thereof is accomplished through spout 85, one or more of the valves 81 being opened and one or more of the corresponding valves 75 being opened effecting communicating between one or more of the tank compartments with manifold 79. Flow outwardly through spout 85 may then be accomplished by opening valve 83.

I claim:

1. A liquid loading system for tank bodies, a liquid delivery line, means for connecting said delivery line to a tank body, a return line, eduction means interposed in said lines, said eduction means comprising an eductor, a bypass line connecting said delivery line to said eductor, an eduction discharge line connecting said eductor to said return line, a branch line communicating the end of said delivery line for flow to said eductor, a valve in said delivery line between said bypass line and said branch line, a second valve in said eduction discharge line between said eductor and said return line, one of said valves being in open position for flow and the other of said valves being in closed position against flow, said valves being coupled for concurrent shift to close said one valve and open said other valve and reverse shift to return said valves to the first said valve positions, shift of said valves to closed position of said delivery line valve and open position of said eduction line valve establishing flow through said eductor to withdraw liquid from said branch line and said connecting means for delivery into said return line.

2. In a liquid loading system for tank bodies comprising a liquid delivery line, means for connecting said delivery line to a tank body, a return line, means for connecting said return line to a tank body, eduction means interposed in said lines, said eduction means comprising an eductor, a bypass line connecting said delivery line to said eductor, an education discharge line connecting said eductor to said return line, branch lines respectively communicating the ends of said delivery and return lines for flow to said eductor, a valve in said delivery line between said bypass line and said delivery branch line, a second valve in said eduction discharge line between said eductor and said return line, one of said valves being in open position for flow and the other of said valves being in closed position against flow, said valves being coupled for concurrent shift to close said one valve and open said other valve and reverse shift to return said valves to the first said valve positions, shift of said valves to closed position of said delivery line valve and open position of said eduction line valve establishing flow through said eductor to withdraw liquid from said branch lines and said connecting means for delivery into said return line.

3. A liquid loading system for tank bodies comprising a liquid supply, a liquid delivery line connected to said supply, a pump interposed in said delivery line, means for connecting said delivery line to a tank body, a return line, means for connecting said return line to a tank body, said return line being connected into said delivery line between said pump and said supply, eduction means interposed in said lines, said eduction means comprising an eductor, a bypass line connecting said delivery line to said eductor, an eduction discharge line connecting said eductor to said return line, branch lines respectively communicating the ends of said delivery and return lines for flow to said eductor, a valve in said delivery line between said bypass line and said delivery branch line, a second valve in said eduction discharge line between said eductor and said return line, one of said valves being in open position for flow and the other of said valves being in closed position against flow, said valves being coupled for concurrent shift to close said one valve and open said other valve and reverse shift to return said valves to the first said valve positions, shift of said valves to closed position of said delivery line valve and open position of said eduction line valve establishing flow through said eductor to withdraw liquid from said branch lines and said connecting means for delivery into said return line.

4. In combination with a liquid supply, a delivery line communicated at one end to said supply, a return line connected into said delivery line adjacent said supply, a tank-type vehicle body having a manifold, pipe means communicating said manifold with the bottom of the interior of said body, said delivery line being detachably connected to said manifold, said body including a collector, means detachably connecting said collector to said return line, and eduction means coupled to said delivery and return lines, said eduction means including valve means for bypassing delivery flow to establish eduction flow.

5. A liquid loading system for tank bodies, a liquid delivery line, means for connecting said delivery line to a tank body, a return line, eduction means interposed in said lines, said eduction means comprising an eductor, a bypass line connecting said delivery line to said eductor, an eduction discharge line connecting said eductor to said return line, a branch line communicating the end of said delivery line for flow to said eductor, a valve in said delivery line between said bypass line and said branch line, shift of said valve to closed position of said delivery line establishing flow through said eductor to withdraw liquid from said branch line and said connecting means for delivery into said return line.

6. A liquid loading system for tank bodies, a liquid delivery line, means for connecting said delivery line to a tank body, a return line, eduction means interposed in said lines, said eduction means comprising an eductor, a bypass line connecting said delivery line to said eductor, an eduction discharge line connecting said eductor to said return line, a branch line communicating the end of said delivery line for flow to said eductor, a valve in said delivery line between said bypass line and said branch line, a second valve in said eduction discharge line between said eductor and said return line, one of said valves being in open position for flow and the other of said valves being in closed position against flow, shift of said valves to closed position of said delivery line valve and open position of said eduction line valve establishing flow through said eductor to withdraw liquid from said branch line and said connecting means for delivery into said return line.

7. A liquid loading system for tank bodies, a liquid delivery line, means for connecting said delivery line to a tank body, a return line, eduction means interposed in said lines, said eduction means including valve means for establishing flow from said delivery line through said eduction means to withdraw liquid from said connecting means for delivery into said return line.

References Cited in the file of this patent

UNITED STATES PATENTS

| | | |
|---|---|---|
| 288,901 | Whiting | Nov. 20, 1883 |
| 1,780,605 | Spinney | Nov. 4, 1930 |
| 1,949,364 | Ball | Feb. 27, 1934 |
| 2,056,828 | Clawson | Oct. 6, 1936 |
| 2,236,347 | Stancliffe | Mar. 25, 1941 |
| 2,301,821 | Scott | Nov. 10, 1942 |
| 2,384,628 | Krone | Sept. 11, 1945 |
| 2,439,887 | Elliott | Apr. 20, 1948 |
| 2,460,159 | White | Jan. 25, 1949 |
| 2,537,266 | Cranberg | Jan. 9, 1951 |
| 2,539,663 | Hague | Jan. 30, 1951 |
| 2,588,869 | Pinaire | Mar. 11, 1952 |

FOREIGN PATENTS

| | | |
|---|---|---|
| 103,570 | Switzerland | Mar. 1, 1924 |